United States Patent [19]
Baldi

[11] 3,948,689

[45] Apr. 6, 1976

[54] CHROMIC-PHOSPHORIC ACID COATED ALUMINIZED STEEL

[75] Inventor: Alfonso L. Baldi, Drexel Hill, Pa.

[73] Assignee: Alloy Surfaces Company, Inc., Wilmington, Del.

[22] Filed: Oct. 9, 1973

[21] Appl. No.: 404,665

Related U.S. Application Data

[63] Continuation-in-part of Ser. Nos. 357,616, May 7, 1973, and Ser. No. 304,220, Nov. 6, 1972, Pat. No. 3,936,539, and Ser. No. 254,403, May 18, 1972, Pat. No. 3,785,854, and Ser. No. 219,514, Jan. 20, 1972, Pat. No. 3,801,357, and Ser. No. 90,682, Nov. 18, 1970, Pat. No. 3,764,371, said Ser. No. 219,514, and Ser. No. 90,682, each is a continuation-in-part of Ser. No. 837,811, June 30, 1969, abandoned.

[52] U.S. Cl. ............... 148/31.5; 29/195; 29/196.2
[51] Int. Cl.² ......................................... B32B 15/18
[58] Field of Search ............ 29/195 T, 195 P, 196.2; 117/71 M, 107.2 P; 148/6.16, 6.27, 31.5

[56] References Cited
UNITED STATES PATENTS

| | | | |
|---|---|---|---|
| 2,490,543 | 12/1949 | Robertson | 29/196.2 X |
| 2,490,549 | 12/1949 | Schultz | 29/196.2 X |
| 2,562,118 | 7/1951 | Osdal | 148/6.16 |
| 2,917,818 | 12/1959 | Themson | 117/71 M X |
| 3,248,249 | 4/1966 | Collins | 148/6.16 X |
| 3,248,251 | 4/1966 | Allen | 106/286 |
| 3,284,319 | 11/1966 | Hill | 148/6.16 X |
| 3,618,193 | 11/1971 | Anderson | 29/195.7 |
| 3,637,354 | 1/1972 | Zaremski | 29/191.6 |
| 3,713,903 | 1/1973 | Zaremski | 117/71 M X |

*Primary Examiner*—L. Dewayne Rutledge
*Assistant Examiner*—Arthur J. Steiner
*Attorney, Agent, or Firm*—Connolly and Hutz

[57] ABSTRACT

Low temperature aluminum diffusion is of better quality when effected with a pack energized by aluminum chloride or other material that does not generate nitrogen and is shielded from contacting the work pieces until after the pack is heated to energizing temperatures. The resulting aluminizing very effectively protects steels against corrosion in marine atmospheres, particularly when there is a chromate-type coating applied over the aluminizing. Highly effective chromate-type coating mixture consists essentially of aqueous solution of chromic and phosphoric acid also containing magnesium salts of said acids with or without dispersed polytetrafluoroethylene particles. The salts of divalent metals such as calcium, zinc, strontium, manganese, cobalt and nickel whose chromates are soluble in acid, can be used instead of or in addition to the magnesium. Such coating mixture is best applied over porous pre-coating of colloidal inert particles.

8 Claims, No Drawings

CHROMIC-PHOSPHORIC ACID COATED ALUMINIZED STEEL

This application is in part a continuation of applications Ser. No. 357,616 filed May 7, 1973, Ser. No. 304,220 filed Nov. 6, 1972 (U.S. Pat. No. 3,936,539 granted Feb. 3, 1976), Ser. No. 254,403 filed May 18, 1972 (U.S. Pat. No. 3,785,854 granted Jan. 15, 1974), Ser. No. 219,514 filed Jan. 20, 1972 (U.S. Pat. No. 3,801,357 granted Apr. 2, 1974), and Ser. No. 90,682 filed Nov. 18, 1970 (U.S. Pat. No. 3,764,371 granted Oct. 9, 1973). The last two of these prior applications are in turn continuations-in-part of application Ser. No. 837,811 filed June 30, 1969 and subsequently abandoned.

The present invention relates to the coating of metals to make them more resistant to exposure.

Among the objects of this invention is the provision of improved coating mixtures and techniques effective to increase the resistance of steels to marine atmospheres and particularly at elevated temperatures.

Additional objects of the present invention include the provision of more weather-resistant parts of jet engine compressors.

The foregoing as well as other objects of the present invention will be more fully understood from the following description of several of its exemplifications.

The aluminizing of metals by a diffusion coating process is known to improve the resistance of the metals to exposure. A high temperature aluminizing of this kind is shown for example in U.S. Pat. No. 3,257,230 and in Canadian Pat. No. 806,618. This is a complex type of aluminizing.

A good form of simple aluminizing is accomplished with a pack consisting of 70% alumina and 30% aluminum, both −325 mesh, activated with ½% aluminum chloride, using a coating temperature of 850°F for 20 hours. Another good example of a pack contains 80% of the alumina and 20% of the aluminum powder, with the same activator in the same concentration, used at 800°F. It is particularly desirable to keep the temperature below about 1000°, better still below about 900°F, during this coating treatment and the aluminizing can be carried out in any other form of diffusion-coating apparatus. The coating produced by a simple aluminizing pack gives better results when the pack has been previously used in a coating run. It is accordingly helpful when starting with a fresh pack to give it a break-in treatment with a dummy work piece, or even with no work piece at all.

The simple aluminizing described above does not produce a consistently uniform coating when an ammonium halide is used as the energizer and the material being coated is an age-hardener or a martensitic stainless steel. The lack of uniformity appears to be due to the presence of nitrogen in the retort atmosphere during the coating, and the resultant erratic formation of nitrides. The aluminum chloride energizer does a good job of flushing out residual air without introducing nitrogen, but other energizers such as elemental iodine and bromine, iodine trichloride or similar nitrogen-free halogen compounds including other higher halides of aluminum (chloride, bromide or iodide), halides of silicon, colombium, titanium, boron, zirconium, hafnium, tantalum, chromium, molybdenum, tungsten, iridium, osmium, platinum, gallium, germanium, tin and phosphorus will do the same although they are not preferred. Whichever energizer is used is preferably in an amount from about 0.1 to about 1% of the pack weight. Also better results are obtained if the unvaporized energizer is isolated from the work pieces as by enclosing all the energizer in a container that permits the escape of vapor. A container for this purpose can be made of fine screening or with an open top or with a loosely fitted top and several of such containers can be distributed throughout the mix. Such a container or plurality of containers can be embedded in the coating pack and will release vapors of energizer as the pack is heated up to coating temperature, such vapors accomplishing the same flushing and deposit-accelerating results expected of an energizer, but without the coating flaws experienced when solid aluminum chloride is merely mixed into the entire pack. The container holding the energizer can be made of aluminum, plain carbon steel or other suitable metal such as aluminized steel or low alloy chromium steel, or even martensitic stainless steel, and the energizer contained in it can also be mixed with an excess of inert materials like alumina, or of pack mixture. The energizer is preferably anhydrous, but can also be partially or completely hydrated. The retort itself can be made of any of the foregoing steels.

Instead of or in addition to the use of the foregoing energizer containers, a sheet of perforated metal can be embedded in the diffusion coating pack as a barrier between the work pieces and the energizer locations. Thus a 15 mil thick sheet of plain carbon steel or of aluminized steel with 1/16 inch diameter circular perforations 1/16 inch apart can completely encircle the inner portion of an annular retort and porous-walled cannisters of the energizer can be placed in that inner portion with the work pieces all in the outer portion of the retort. Other metals such as inconel or chromized steel can also be used as the barrier and the perforations can vary from about one thirty-second inch to about one-fourth inch in size, and screening can be used in place of sheet metal. Metals that contain silicon or similar ingredients that have very volatile halides, in a concentration greater than about 2% are not preferred for this use.

As an alternative packing technique all the energizer can be confined to a stratum of the pack below the work pieces, with the remainder of the pack being a uniform mixture of filler and diffusing material. Thus good results are obtained when the diffusion retort is first packed with about a ½ to 1 inch deep layer of the pack material, all the energizer is then sprinkled over that layer, another 1 inch deep layer of energizer-free pack placed over the foregoing, and the retort then filled with work pieces and additional pack. However it is simpler to pack the retort with the separately contained energizer, and work pieces cannot be inadvertently inserted in such a separately contained energizer. Should a work piece be accidentally pushed into the separately stratified energizer of the alternative packing technique, a good coating will not form on the portion of the work piece that has penetrated into that stratum. A perforated metal barrier as referred to above is also desirably placed over the stratum of energizer-containing pack and below the work, to improve the coating action.

In general the simple aluminizing as well as the more complex aluminizing are effectively used to cause an aluminum pick-up of about 0.5 to 7.5 milligrams per square centimeter of surface coated, giving a coating case about 0.1 to about 1.5 or 2 mils thick. A preferred pick-up range is from about 1 to about 5 milligrams per square centimeter. The coating packs used can be replenished as by adding 1% aluminum after every use, even after a break-in use.

A useful diffusion aluminizing of stainless steel and chromium steels is also effected by incorporating with the aluminum about one-fourth to three-fourths metallic manganese calculated on the weight of the aluminum. Thus a diffusion coating pack of 60% alumina, 30% aluminum and 10% manganese will give at 875°F over a period of ten hours an aluminized coating on age-hardenable or martensitic stainless steels that provide good protection, particularly against marine-type corrosion. Type 410 stainless steel jet engine compressor blades or gas generator housings given a 0.3 to 1 mil thick coating case from a manganese-free aluminum pack at temperatures from 800° to about 1000°F will however withstand corrosion in salt air for a particularly long period of time.

A chromate-phosphate type coating applied over the manganese-containing aluminum diffusion coating or the manganese-free aluminum coating, further increases corrosion resistance. A particularly effective coating of this type for this purpose is one that is made by dipping the aluminized compressor blade after vapor honing to clean the surface, into an aqueous solution of phosphoric acid and chromic acid containing per liter about 5 to 100 grams phosphoric acid and about 1 to 25 grams chromic acid, removing the dipped blade and permitting the solution to drain, followed by calcining the blade with the residual coating solution thereon at 800°F for 10 minutes. So-called conversion coatings such as described in U.S. Pat. No. 3,385,738 are not sufficiently protective at elevated temperatures, that is at about 600°F or higher. The chromic acid-phosphoric acid coatings of application Ser. No. 90,682 with or without the related treatments there disclosed are much better in this respect and provide protection at temperatures that reach as high as 1200°F.

Very effective results on aluminized greek ascoloy are obtained with 10 to 15 grams $CrO_3$ and 57 grams orthophosphoric acid per liter, the calcining being at 600°F for 40 minutes. In general calcining temperatures can vary from about 450 to about 1100°F, and should be long enough to cause the chromate-type coating to become almost completely (at least about 90%) insoluble in water.

Even better results are obtained with age-hardenable and martensitic stainless steels when the chromate-type coating also contains magnesium as well as particles of polytetrafluoroethylene, as in the following Examples:

EXAMPLE I 180 grams $CrO_3$
130 grams MgO
410 cc 85% $H_3PO_4$ (by weight in water)
15 cc aqueous dispersion of polytetrafluoroethylene particles less than 1 micron in size, containing 13.5 grams of the resin, and
Water to make up 3 liters of coating bath.

The MgO dissolves in the acid and remains dissolved upon dilution, while the resin particles remain undissolved but dispersed. If the stock resin dispersion is sensitive to acid, it is added after the MgO is dissolved inasmuch as this sharply lowers the acidity. The resin particles need not be very stably dispersed, although such stability is improved through the use of a small amount of a dispersing agent that is not sensitive to acid or oxidizers. Non-ionic surface-active agents or quaternized imidazoline surface-active agents such as

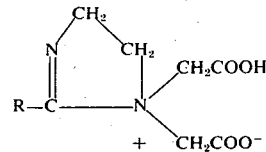

are suitable for this purpose. In any event the bath can be agitated to assure uniformity of dispersion.

Dipping an aluminized greek ascoloy compressor blade in the bath of this example at room temperature, followed by oven heating at 700°F for 60 minutes provides a cured coating weighing about 0.27 milligrams per square centimeter that gives excellent protection in marine environments.

The ingredients of the bath of the foregoing example can vary as follows:

| | |
|---|---|
| Magnesium | 0.4 to 1.7, preferably 0.9 to 1.4 mols per liter |
| Chromate ion | 0.2 to 1, preferably 0.4 to 0.8 mols per liter |
| Phosphate ion | 0.7 to 4, preferably 1.5 to 3.5 mols per liter |
| Resin | 2 to 14, preferably 3 to 10 g per liter |

Coating weights above about 0.5 milligram per square centimeter tend to craze, and below about 0.2 milligram per square centimeter are not as effective although as little as 0.05 milligram of coating per square centimeter gives noticeably improved corrosion resistance. This improvement increases with increased coating weight, and two coats can be used if desired, as by going through a second such coating treatment after a first coating is applied and cured, to make a total chromate-type coating weight of about 1 milligram or more per square centimeter. The coating is hydrophobic after curing, and another layer is then difficult to apply unless the cured layer is heated to about 200°F or higher.

It is simpler to apply heavy coatings of the foregoing type by first applying to the aluminized surface a porous adherent layer of essentially inert colloidal particles of refractory solid such as alumina to provide a sponge-like substrate for the final magnesium-chromate-phosphate-resin coating layer. In this way a sponge-like preliminary layer weighing about 1/10th to about 1.0 milligram per centimeter can receive in one or two spray applications for example enough of a magnesium-chromate-phosphate-resin layer to make a combined coating weight of about 5/10ths to about 2 milligram per centimeter over the aluminum without crazing and with very good corrosion resistance. However such combined layers provide excellent resistance to marine atmospheres at high temperatures when these coatings weigh as little as 3/10ths milligrams per centimeter. Such combined coatings are very insoluble and are good dielectrics after baking at 600°–1000°F for 30 minutes.

The sponge-like substrate layer can additionally contain some or all of the ingredients of the magnesium-chromate-phosphate-resin top layer. The addition of such ingredients increases the adhesion of the sponge-like substrate layer to the aluminized surface.

The following is an example of such a compound coating:

EXAMPLE II

The metal here treated is AISI 410 stainless steel diffusion coated with aluminum in a pack that provided a case 0.0006 inch thick. This coating was effected in a powder pack mixture of 20% aluminum, and 80% aluminum oxide, both minus 325 mesh. The diffusion retort was of doughnut shape having an outer diameter of 30 inches and an inner diameter of 8 inches, its height being 24 inches. Compressor blades of the foregoing stainless steel were imbedded in the aluminum-alumina pack mixture, and six perforated tubes of the same stainless steel 2 inches in diameter and 20 inches high filled with an energizer mixture with a perforated shield around each tube, were uniformly inserted in the pack and distributed around the doughnut. The energizer mixture was a pack containing 3% anhydrous aluminum chloride, and the total amount of anhydrous aluminum chloride corresponding to about 0.2% of the entire pack. A perforated cover was placed on top of the retort and the retort so covered enclosed is a protective shell through which a stream of hydrogen was slowly flushed. The aluminizing was conducted for 20 hours at a temperature of 885°F.

The resulting aluminized blades were washed with water, ultrasonically rinsed with water containing a little surfactant, lightly vapor honed with a dispersion of fine aluminum oxide in water, or lightly blasted with −325 glass beads projected by a stream of air propelled by a pressure of 5 psi and then sprayed with an aqueous dispersion of colloidal aluminum oxide containing 17% alumina particles 5 millimicrons in size. The sprayed blades were permitted to air dry at room temperature. The resulting film weighed about 0.5 milligrams per square centimeter.

Over the air dried layer was then sprayed a mixture prepared by dissolving to make up to 1 liter in water the following ingredients:

37.6 g. $CrO_3$
19.8 g. $MgCr_2O_7$
195 g. $Mg(H_2PO_4)_2$
4 g. Dispersed polytetrafluoroethylene and the sprayed material baked at 700°F for 30 minutes. The amount of spray was such that the aluminum surface carried a total weight of 1.0 milligram per square centimeter, and the final product showed no crazing and excellent resistance to corrosion. Even such dual coatings weighing as much as 2 milligrams per square centimeter showed no crazing.

Similar results are obtained when the colloidal alumina mixture contains any or all of the other top coat ingredients listed above. Also the amounts of those ingredients can be varied as for example by doubling the amount of $Mg(H_2PO_4)_2$. Large amounts of acid tend to flocculate out the alumina from dispersed conditions and it is therefore preferred such mixtures be prepared immediately before use. It may be desirable to add dispersing agents to the alumina dispersion to increase its stability when the top coat ingredients are added. A flocculated dispersion is not as desirable for the purposes of the present invention because the aluminum oxide particles increase greatly in size upon flocculation. The dispersion is preferably somewhat acid even before the top coat ingredients are added.

The colloidal alumina particles can be varied in size, preferably up to about 1 micron, and can be replaced by non-dispersed dry alumina powder which is simply spread over the surface of the substrate although this does not provide the high degree of uniformity obtained from dispersing in liquid. Indeed very fine dry powder will satisfactorily adhere to a metal surface when the surface is merely dipped into a bed of the powder. Such adhesion also takes place when the substrate is inserted in a floating bed of the powder. The alumina can also be replaced by silica or magnesia or titania or zirconia or even Kaolin, although the dual coatings in which alumina is used are much harder and much more erosion-resistant.

The increased hardness contributed by the alumina makes it also desirable to use as a layer over a silica base layer, before the magnesium-chromate-phosphate-resin coating is applied. The final coating is also a good dielectric when a stratum of alumina or any of the other inert powders is used.

The magnesium cations in the foregoing examples can be replaced by other divalent cations whose chromates are soluble in the acid coating baths. Example of such other cations are calcium, zinc, strontium, manganese, cobalt and nickel. Also, as pointed out above, no metal cations need be used although the use of magnesium cations is particularly preferred.

The coatings of the present invention are highly effective in protecting against, the weather, jet engine compressor components made of steel that has a surface containing at least 1% chromium. Low alloy steels as well as high chromium steels both show much less pitting when so protected, particularly under the salty conditions of marine atmospheres. A low alloy steel that lends itself to such protection is SAE 52100 steel containing about 1% carbon, about 0.4% manganese, about 1.35% chromium, a maximum of 0.03% phosphorus and a maximum of 0.035% sulfur. The high-chromium martensitic and age-hardenable steels are especially suited for such protected use in jet engine compressor vanes and the like. A typical martensitic steel of this kind is type 410 stainless steel having about 12.5% chromium, a maximum of 0.15% carbon, a maximum of 1% manganese, a maximum of 1% silicon, a maximum of 0.04% phosphorus and a maximum of 0.03% sulfur. Representative age-hardenable steels for this use are 17-7 PH and 17-4 PH, both containing about 16.5% chromium. The former has about 0.09% carbon, about 7% nickel, about 1% aluminum, a maximum of 1% silicon, a maximum of 1% manganese, a maximum of 0.04% phosphorus and a maximum of 0.03% sulfur, while the latter has about 0.05% carbon, about 4% nickel and about 4% copper.

An aluminized case about 0.1 to about 2 mils thick on the chromium-bearing surface is an essential ingredient in the protection provided by the present invention. The surface of such case is not readily wet by aqueous solution containing chromic acid unless those solutions also contain dispersed particles, so that the etching treatment described in Ser. No. 90,682 is not needed where the stratum of finely-divided particles is applied, or when such stratum is not used but the top coating solution contains dispersed particles like the polytetrafluoroethylene particles of Examples I and II. However where the intervening porous stratum of finely divided particles is applied, it is not necessary to have any particles dispersed in the top coating solution inasmuch as such solution uniformly spreads over and through such stratum. The elimination of the polytetrafluoroethylene reduces the effectiveness of the protection somewhat but not enough to significantly detract from the usefulness of the resulting protection. Other inert particles such as alumina, silica and the like can be dispersed in the top coating solution in place of or in addition to the polytetrafluoroethylene to improve its wetting action as well as the hardness of the final protective layer.

During the firing of the top coating some of its hexavalent chromium is reduced to trivalent condition. A small amount of reducing agent can also be incorporated in the top coating solution to increase the degree of reduction to as much as 50%. When more than that fraction of chromium is reduced to trivalent condition, the protection provided by the resultant coating is rendered somewhat inferior. Reducing agents that can be used for this purpose include triethanolamine, sucrose, ethyleneglycol, as well as any of the other reducing agents referred to in U.S. Pat. No. 2,911,332, granted Nov. 3, 1959. In general the amount of reducing agent should be not greater than one part by weight of reducing agent to six parts by weight total $CrO_3$, both as free chromic acid and as chromate.

The excellent protection provided by the combinations of the present invention seem to be associated with increases in its electrical insulation effects. In other words, the better the dielectric properties of the coating, the better is the protection it provides. It generally takes at least 0.3 milligram of refractory oxide, such as alumina, per square centimeter of coated surface, to attain the best results.

The improved protection of the present invention is also obtained although in somewhat lesser degree when the diffusion coated aluminum case is replaced by an aluminum plating such as is formed by dipping the substrate in molten aluminum or by condensing vaporized aluminum on the substrate. In addition, the top coatings with or without the porous stratum will do an excellent job of protecting aluminum and aluminum base alloys even where it is not in the form of a coating on chromium-containing steel. Thus sheet aluminum as well as aluminum base alloys and even zinc and cadmium are very effectively protected by giving them the top coating described in the first portion of Example I. Those substrates that do not contain steel do not have to be held below 1000°F, and a coating on an aluminum sheet can be fired at temperatures higher than the 900°F mentioned above.

The aluminizing of substrates can also be effected at higher temperatures where the substrates are not steels, and such aluminum-coated materials can likewise be protected by the top coating combinations of the present invention. Furthermore at diffusion coating temperatures of 1000°F or higher it is not necessary to use a nitrogen-free activator, and $NH_4Cl$ is then perfectly suitable for such use. Thus a B-1900 jet engine blade can be packed in an aluminizing pack in a tubular holder which is a snug fit around the blade, and aluminized at 1350°F for 8 hours with a pack energized by ¼% $NH_4Cl$. A technique for using a snugly fitting tubular holder is disclosed in patent application Ser. No. 159,175, filed July 2, 1971 (U.S. Pat. No. 3,824,122 granted July 16, 1974).

Also, as shown in that application, the blade can have its root masked by using a masking pack at that location. In addition to the masking pack compositions of parent application Ser. No. 219,514, there can be used in such an arrangement powdered calcium oxide, with or without a diluent such as alumina. The calcium oxide tends to shrink in volume during use and diluting it with up to 5 times its weight of alumina or $Cr_2O_3$ helps reduce the shrinkage. Some discoloration may also be produced by the calcium oxide, but this seems to be only a cosmetic defect inasmuch as metallographic examination shows a sound product is obtained.

The masking of the blade root can also be effected with a purely inert masking pack such as one made up of solely alumina or zirconia or $Cr_2O_3$. Such materials do not completely prevent coating but they sharply reduce the amount of aluminum coating formed on the masked portions. The addition of $Ni_3Al$ to the inert material further reduces or eliminates the deposition of aluminum and the further addition of a little metallic chromium reduces the tendency for the masked portions to show metallurgical changes such as loss of chromium. However when a masking pack is made of a mixture of $Cr_2O_3$ with $Ni_3Al$ and metallic chromium, a very thin chromium deposit forms on the masked surfaces. 39% $Al_2O_3$, 42.8% nickel, 6.5% aluminum, 1.5% chromium and 9.2% $Cr_2O_3$ will at 1300°F in the presence of an activator like aluminum chloride, deposit an exceedingly thin chromium film on superalloys. Such a masking pack is best used after a break-in heat as for example at 1900°F for 15 hours. Similar results are obtained with as little as 5% $Cr_2O_3$ in the pack, and with the $Ni_3Al$ replaced by a nickel-aluminum alloy ranging from $Ni_4Al$ to $Ni_4Al_3$.

The working examples given above are typical of the present invention but other working examples, such as given in parent application Ser. No. 357,616, are also suitable. In addition the MgO in Example I above, can be replaced by an equal weight of CaO or of any of the other divalent alternative oxides. Any such alternative cation or mixtures of cations are desirably used in the proportions given above for magnesium.

Obviously many modifications and variations of the present invention are possible in the light of the above teachings. It is, therefore, to be understood that within the scope of the appended claims the invention may be practiced otherwise than as specifically described.

What is claimed:

1. A jet engine compressor member which in normal use is exposed to the weather, said member being a steel that has a surface containing at least 1% chromium covered by an aluminum diffusion case 0.1 to 2 mil thick, the case being coated with a fired layer of a mixture of from about 5 to 100 parts phosphoric acid and about 1 to 25 parts chromic acid, said layer weighing at least about 0.5 milligrams per square centimeter of coated surface.

2. The combination of claim 1 in which the steel is a martensitic or age-hardenable steel containing at least 10% chromium.

3. The combination of claim 1 in which the fired coating is adhered to the aluminized case with the help of a porous stratum of alumina or silica particles not greater than about 1 micron in size.

4. The combination of claim 1 in which the fired layer also contains as a cation a divalent metal whose chromate is soluble in acid.

5. The combination of claim 4 in which the cation is magnesium, calcium, zinc, strontium, manganese, cobalt or nickel or combinations of those.

6. The combination of claim 1 in which not more than half of the hexavalent chromium has been reduced to trivalent condition.

7. The combination of claim 1 in which the fired layer also contains polytetrafluoroethylene particles not greater than about 1 micron in size.

8. The combination of claim 2 in which the fired layer also contains magnesium cations and polytetrafluoroethylene particles not greater than about 1 micron in size, and it is adhered to the aluminized case with the help of a porous stratum of alumina particles not greater than about 1 micron in size.

* * * * *

UNITED STATES PATENT AND TRADEMARK OFFICE
CERTIFICATE OF CORRECTION

PATENT NO. : 3,948,689
DATED : April 6, 1976
INVENTOR(S) : ALFONSO L. BALDI

It is certified that error appears in the above-identified patent and that said Letters Patent are hereby corrected as shown below:

Claim 3, line 2, "with the help" should be --by means--.

Claim 8, lines 4 and 5, "with the help" should be --by means--.

Signed and Sealed this

Seventh Day of September 1976

[SEAL]

Attest:

RUTH C. MASON
*Attesting Officer*

C. MARSHALL DANN
*Commissioner of Patents and Trademarks*